United States Patent
Tseng et al.

(10) Patent No.: US 9,696,234 B2
(45) Date of Patent: Jul. 4, 2017

(54) EVAPORATIVE EMISSIONS TESTING BASED ON HISTORICAL AND FORECAST WEATHER DATA

(71) Applicant: Ford Global Technologies, LLC, Dearborn, MI (US)

(72) Inventors: Fling Finn Tseng, Ann Arbor, MI (US); Imad Hassan Makki, Dearborn Heights, MI (US); Aed M. Dudar, Canton, MI (US); Robert Roy Jentz, Westland, MI (US); Hsin-hsiang Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 448 days.

(21) Appl. No.: 14/341,571

(22) Filed: Jul. 25, 2014

(65) Prior Publication Data

US 2016/0025589 A1   Jan. 28, 2016

(51) Int. Cl.
  *G01M 3/02* (2006.01)
  *F02M 25/08* (2006.01)
(52) U.S. Cl.
  CPC ........ *G01M 3/025* (2013.01); *F02M 25/0809* (2013.01)
(58) Field of Classification Search
  CPC .................... G01M 3/025; F02M 25/0809
  See application file for complete search history.

(56) References Cited

U.S. PATENT DOCUMENTS

| 5,437,257 | A | 8/1995 | Giacomazzi et al. |
| 6,343,255 | B1 | 1/2002 | Peek et al. |
| 6,535,817 | B1 | 3/2003 | Krishnamurti |
| 6,974,251 | B2 * | 12/2005 | DeRonne ................. G01K 1/20 |
| | | | 374/141 |
| 7,140,235 | B2 | 11/2006 | Mc Lain et al. |
| 7,140,241 | B2 | 11/2006 | Wakahara |

(Continued)

FOREIGN PATENT DOCUMENTS

| CN | 101666271 B | 5/2012 |
| JP | 2008260541 A | 10/2008 |

(Continued)

OTHER PUBLICATIONS

Cavina, N., Corti, E., Sgatti, S., Guidotti, L. et al., "Development of Model-Based OBDII-Compliant Evaporative Emissions Leak Detection Systems," SAE Technical Paper Jan. 10-12, 2008, 2008, doi:10.4271/2008-01-1012,11 pages.

(Continued)

*Primary Examiner* — Paul West
(74) *Attorney, Agent, or Firm* — James Dottavio; McCoy Russell LLP (57) ABSTRACT

A method for a vehicle, comprising: initiating an engine-off natural vacuum test based on an ambient temperature change potential over a testing duration. The ambient temperature change potential may be based on historic weather data and further based on forecast weather data. In this way, the engine-off natural vacuum test may be executed only when conditions favor an in-tank temperature change significant enough to cause a threshold change in fuel tank pressure, thus reducing the number of aborted tests and increasing the test's overall performance metrics.

14 Claims, 4 Drawing Sheets

(56) References Cited

U.S. PATENT DOCUMENTS

| | | |
|---|---|---|
| 7,792,664 B1 | 9/2010 | Crawford et al. |
| 8,308,347 B2 | 11/2012 | Kanie |
| 8,567,239 B2 | 10/2013 | Cunningham et al. |
| 8,649,907 B2 | 2/2014 | Ersavas |
| 8,689,613 B2 | 4/2014 | Perry |
| 8,706,343 B2 | 4/2014 | Streib |
| 2003/0205217 A1 | 11/2003 | McIntyre et al. |
| 2012/0215446 A1* | 8/2012 | Schunder ............ G07C 5/008 702/3 |
| 2013/0041539 A1 | 2/2013 | Collet |
| 2014/0019002 A1 | 1/2014 | Jentz et al. |
| 2014/0026866 A1 | 1/2014 | Pifher et al. |
| 2014/0060160 A1 | 3/2014 | Pursifull |
| 2014/0074385 A1 | 3/2014 | Dudar et al. |

FOREIGN PATENT DOCUMENTS

| | | | |
|---|---|---|---|
| JP | 2009161232 A | 7/2009 | |
| WO | 9937905 A1 | 7/1999 | |
| WO | 2009092473 A1 | 7/2009 | |
| WO | 2010013084 A1 | 2/2010 | |
| WO | 2013173333 A1 | 11/2013 | |

OTHER PUBLICATIONS

Guan, Che et al., "Very Short-Term Load Forecasting: Wavelet Neural Networks With Data Pre-Filtering," IEEE Transactions on Power Systems, vol. 28, No. 1, Feb. 2013, 12 pages.

"A Method to Infer Fuel Type Characteristics Via the Information Cloud," Authors et al.: Disclosed Anonymously, IP.com, IP.com No. IPCOM000235632D, Mar. 14, 2014, 2 pages.

"Evaluation of Equilibrium of Vapor (EOEV) for Fuel Storage Leak Detection," Authors et al.: Disclosed Anonymously, IP.com, IP.com No. IPCOM000236096D, Apr. 4, 2014, 2 pages.

Glugla, Chris P. et al., "System and Method to Identify Ambient Conditions," U.S. Appl. No. 13/672,571, filed Nov. 8, 2012, 34 pages.

Tseng, Fling et al, "Correlation Based Fuel Tank Leak Detection," U.S. Appl. No. 14/172,108, filed Feb. 4, 2014, 47 pages.

Tseng, Fling et al, "Method for Triggering a Vehicle System Monitor," U.S. Appl. No. 14/189,778, filed Feb. 25, 2014, 54 pages.

Anonymous, "A Carbon Canister Integrity Diagnostic for PHEV Using Diurnal Temperature Cycle," IPCOM No. 000240457, Published Jan. 30, 2015, 2 pages.

Anonymous, "A Method to Detect Tiny Fuel Tank Liquid Leaks," IPCOM No. 000241982, Published Jun. 11, 2015, 2 pages.

* cited by examiner

EVAPORATIVE EMISSIONS TESTING BASED ON HISTORICAL AND FORECAST WEATHER DATA

BACKGROUND AND SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere.

Evaporative leaks may be identified using engine-off natural vacuum (EONV) during conditions when a vehicle engine is not operating. In particular, a fuel system may be isolated at an engine-off event. The pressure in such a fuel system will increase if the tank is heated further (e.g. from hot exhaust or a hot parking surface) as liquid fuel vaporizes. As a fuel tank cools down, a vacuum is generated therein as fuel vapors condense to liquid fuel. Vacuum generation is monitored and leaks identified based on expected vacuum development or expected rates of vacuum development. The EONV leak test may be monitored for a period of time based on an available battery charge.

However, the EONV leak test is prone to false failures based on ambient conditions, as the rates of vacuum development are based in part on the ambient temperature. During mild weather conditions, the ambient temperature may restrict the amount of heating or cooling of the fuel tank following engine shut-off, and thus limit the rate of pressure or vacuum development. Unexpected changes in temperature can also influence fuel system temperature. Other weather conditions, such as precipitation, barometric pressure, high wind conditions, etc. may influence fuel tank temperature, and thus skew the pressure/vacuum buildup in a sealed fuel system. An EONV test result is thus unreliable if the ambient weather conditions are unknown. Further, changes in ambient weather that are unfavorable to EONV testing may result in aborted or indeterminate tests, reducing the test execution rate. Initiating an EONV test based on the ambient conditions at that time may not be adequate to predict the conditions during the testing duration. Further, the vehicle control module may be operating in a low-power mode during the test, so as to conserve battery charge. It may thus not be feasible to record ambient conditions during the test.

The inventors herein have recognized the above issues and have developed systems and methods to at least partially address them. In one example, a method for a vehicle, comprising: initiating an engine-off natural vacuum test based on an ambient temperature change potential over a testing duration. The ambient temperature change potential may be based on historic weather data and further based on forecast weather data. In this way, the EONV test may be executed only when conditions favor an in-tank temperature change significant enough to cause a threshold change in fuel tank pressure. This, in turn may reduce the number of aborted tests, increasing the overall performance metrics for the test.

In another example, a system for a vehicle, comprising: a fuel system coupled to an evaporative emissions system; and a controller configured with instructions in non-transitory memory, that when executed cause the controller to: responsive to an indication to perform an engine-off natural vacuum test, and further responsive to a vehicle-off event, retrieving historic weather data and forecast weather data from an off-board computing system; determining an ambient temperature change potential over a testing duration; and initiating the engine-off natural vacuum test based on the ambient temperature change potential. In this way, an accurate profile of ambient conditions may be obtained, leading to a more accurate prediction of fuel tank pressure changes over the testing duration. In turn, this may lead to a relaxation of other EONV test entry conditions while maintaining or improving the overall execution rate of the test.

In yet another example, a method for validating an evaporative emissions system leak test, comprising: performing an engine-off natural vacuum test for a testing duration; storing a result of the engine-off natural vacuum test at a controller; responsive to a vehicle-on event, retrieving historic weather data for the testing duration from an off-board computing system; and validating the result of the engine-off natural vacuum test based on the retrieved historic weather data. By retrieving weather data for the testing duration following the EONV test, an accurate estimation of expected fuel tank pressure changes may be obtained. Further, mitigating weather conditions may be detected, and tests occurring during such conditions may be discarded. In this way, the number of false test results may be decreased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
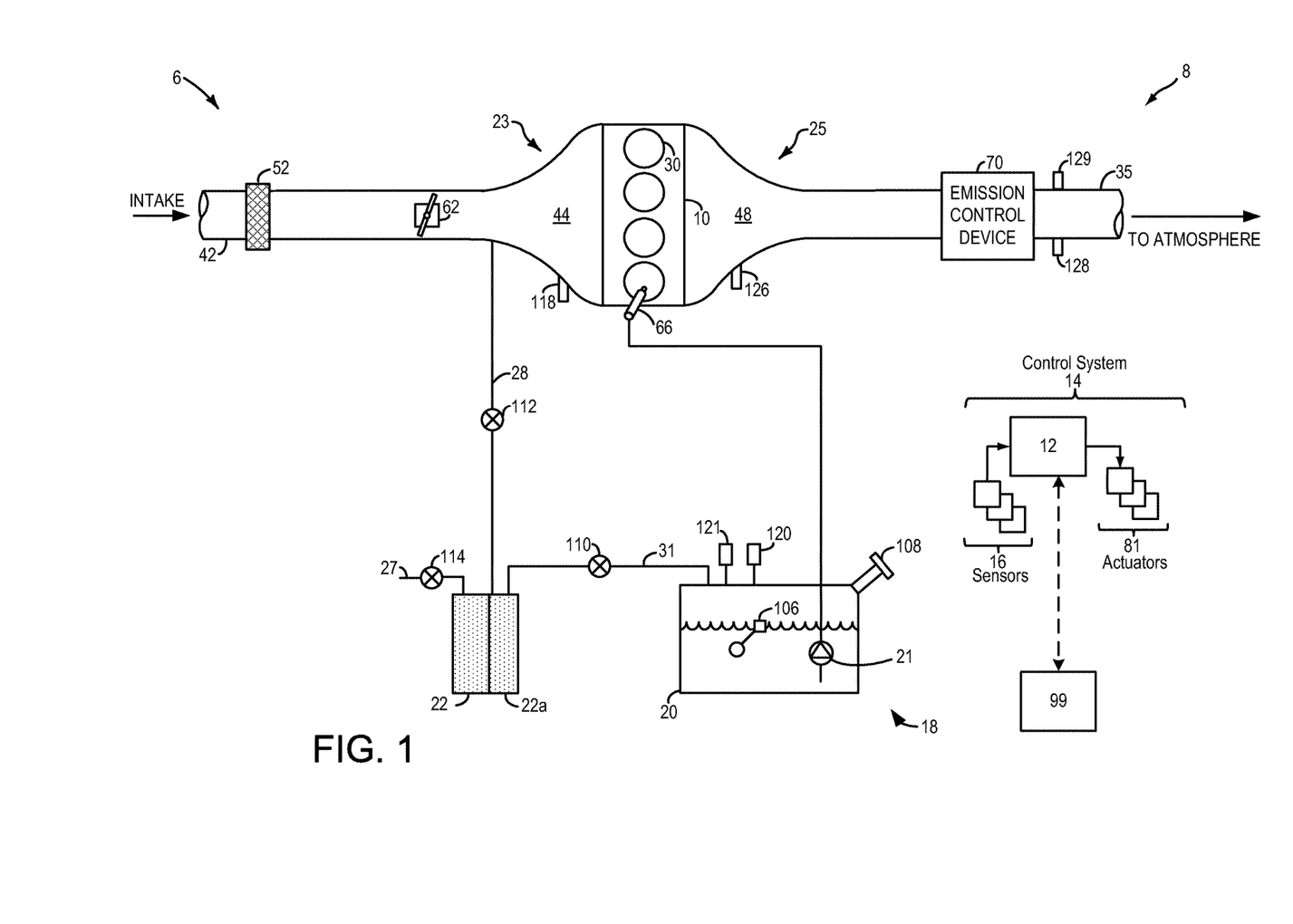
FIG. 1 schematically shows a fuel system and emissions system for a vehicle engine.
Figure 2:
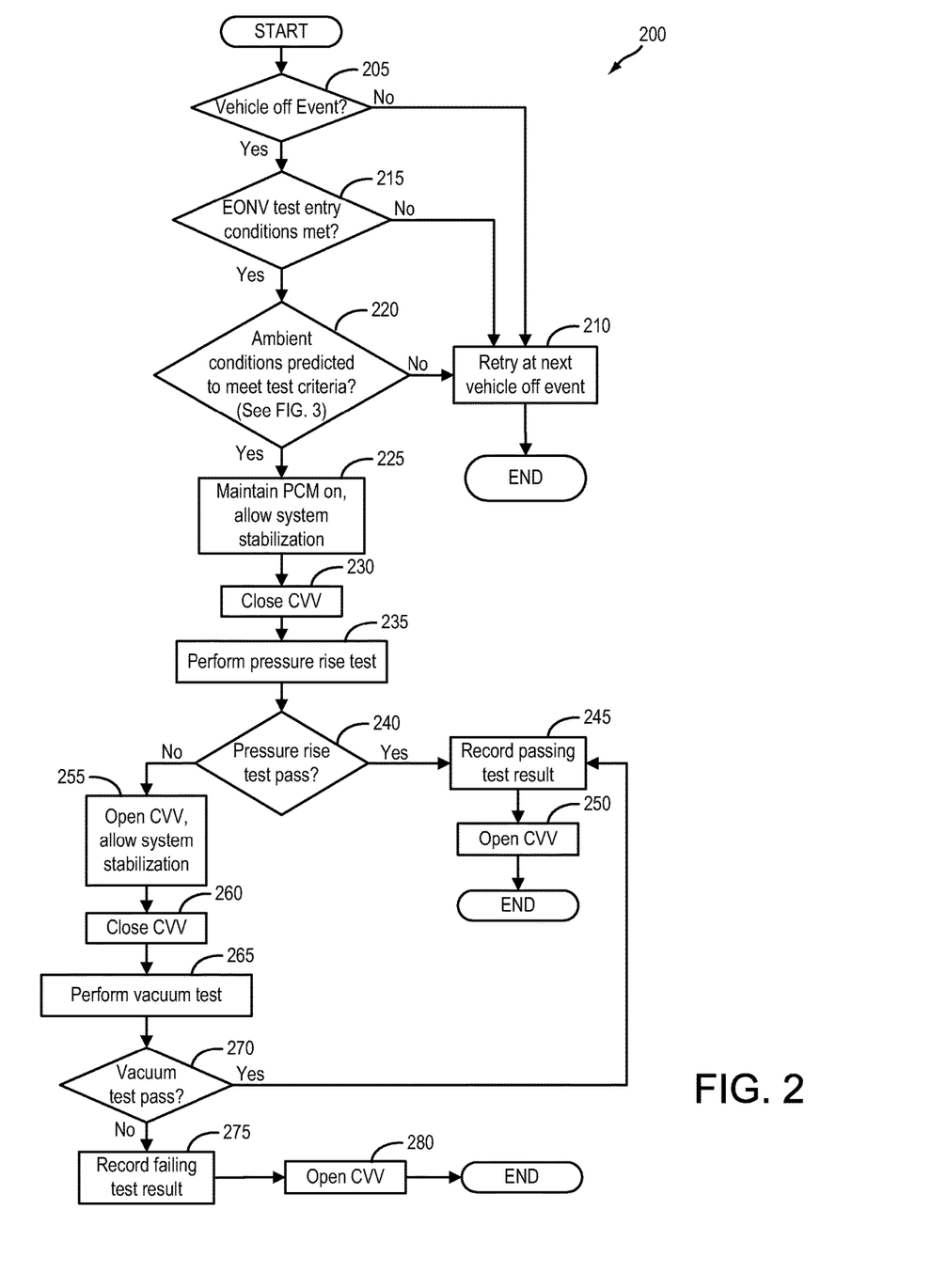
FIG. 2 shows a flow chart for a high-level method for performing an engine-off natural vacuum test.
Figure 3:
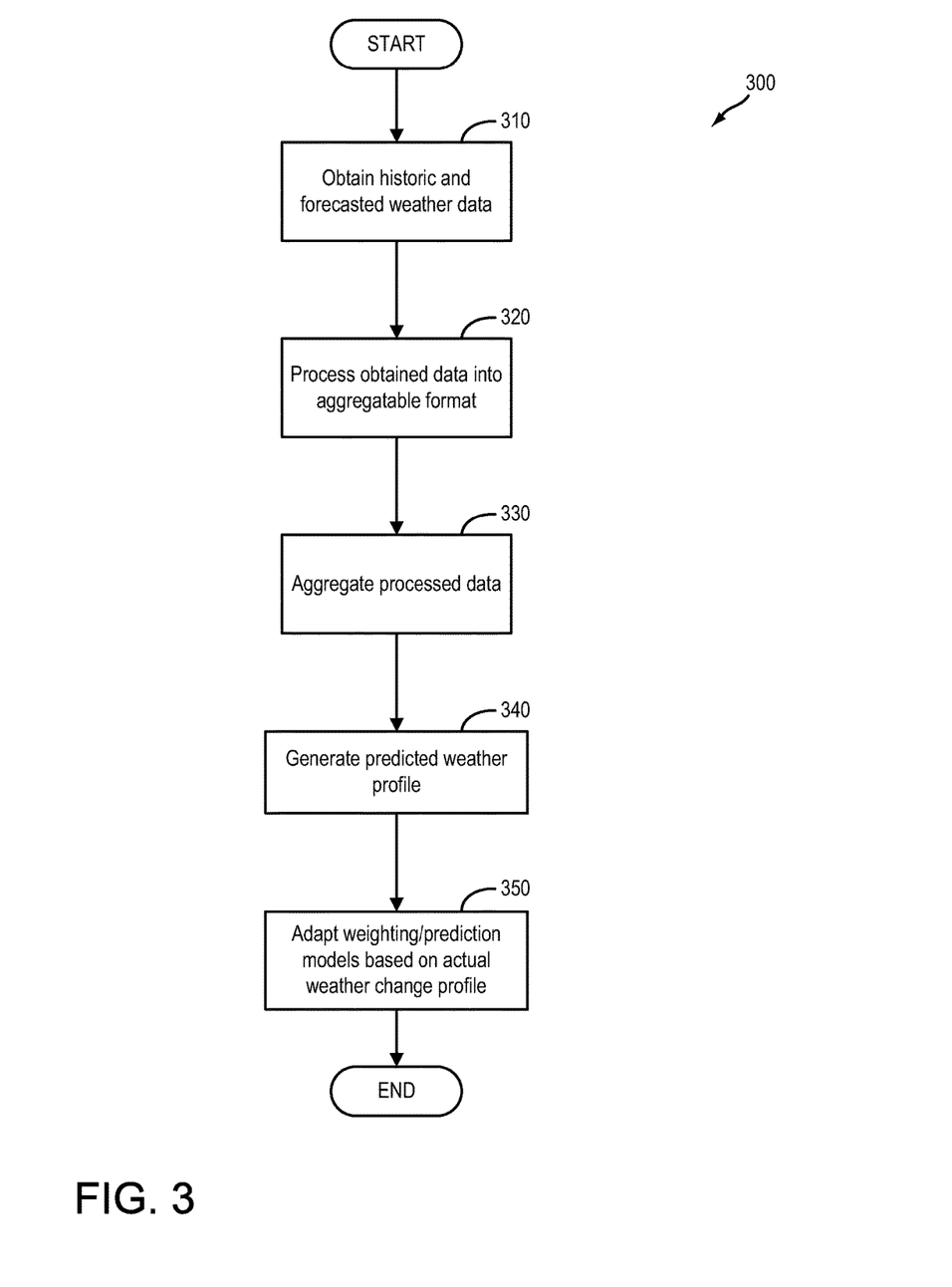
FIG. 3 shows a flow chart for a high-level method for retrieving and analyzing historical and forecast weather data.
Figure 4:
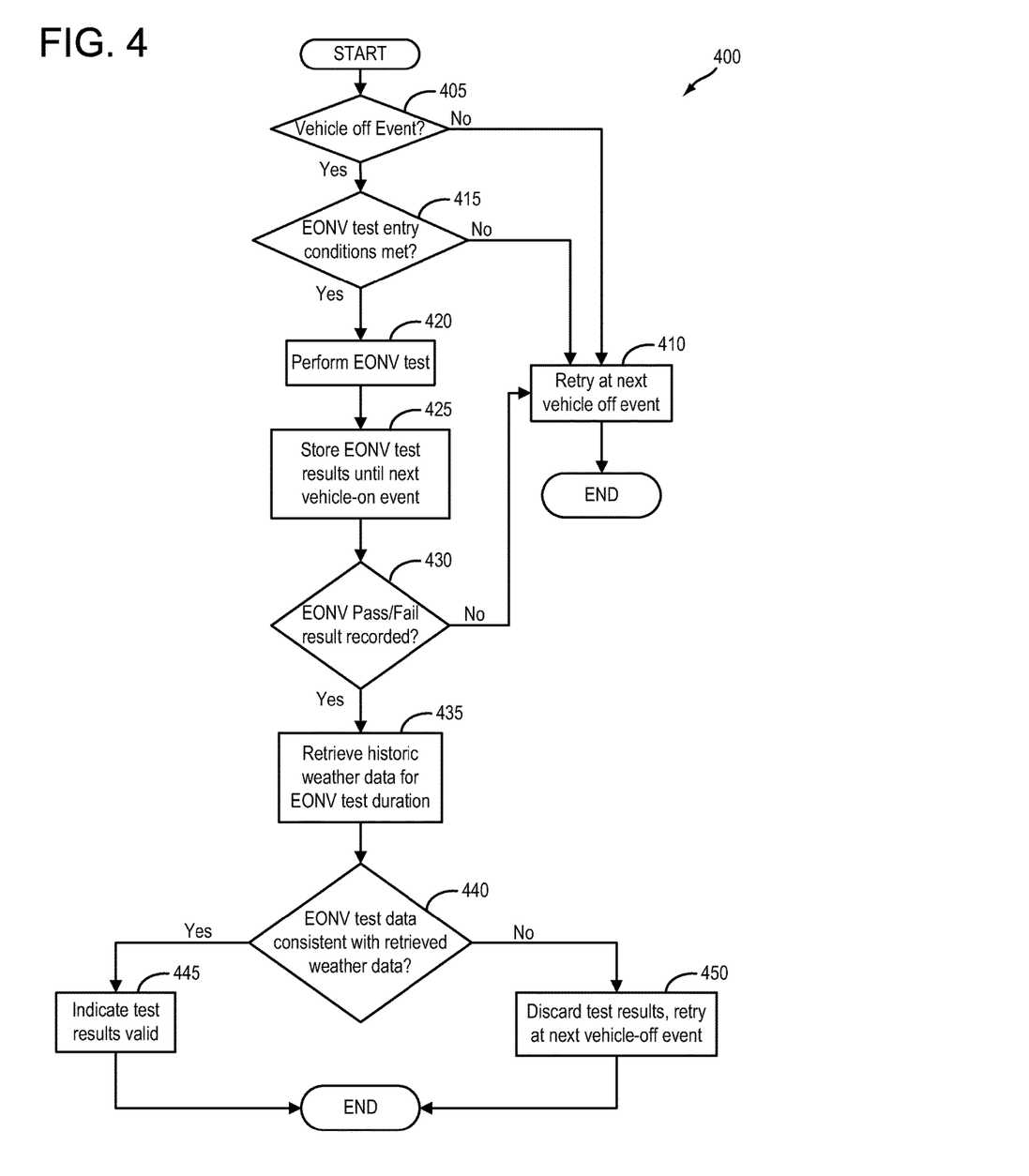
FIG. 4 shows a flow chart for a high-level method for validating an engine-off natural vacuum test based on retrieved weather data.

This detailed description relates to systems and methods for performing an engine-off natural vacuum (EONV) leak test for a vehicle fuel system. In particular, the description relates to systems and methods for scheduling and/or validating an EONV test based on weather data retrieved from an off-board computing system. The EONV test may be applied to a hybrid vehicle system comprising a fuel system and an evaporative emissions system, as depicted in FIG. 1. FIG. 2 depicts a method for scheduling an EONV test based on predicted weather patterns. The predicted weather patterns may be derived from data retrieved from an off-board computing system and processed at the vehicle controller, as depicted in FIG. 3. Additionally or alternatively, an EONV test may be validated following completion of the test by analyzing the EONV test results in the context of weather recorded during the test, as depicted in FIG. 4.

FIG. 1 shows a schematic depiction of a hybrid vehicle system 6 that can derive propulsion power from engine system 8 and/or an on-board energy storage device, such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein and with regard to FIGS. 2, 3, and 4.

Controller 12 may also be configured to intermittently perform leak detection routines on fuel system 18 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, and/or for a system with leaks of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

Control system 14 may be communicatively coupled to an off-board computing system 99 such as a network or cloud computing system via wireless communication, which may be Wi-Fi, Bluetooth, a type of cellular service, or a wireless data transfer protocol. As such, this connectivity where the vehicle data is uploaded, also referred to as the "cloud", may be a commercial server or a private server where the data is stored and then acted upon by optimization algorithms. The algorithm may process data from a single vehicle, a fleet of vehicles, a family of engines, a family of powertrains, or a combination thereof. The algorithms may further take into account the system limitations, produce calibration data for optimizing powertrain outputs, and send them back to the vehicle(s) where they are applied. Off-board computing system 99 may store or provide access to data that may be downloaded to control system 14 for processing by controller 12.

An engine-off natural vacuum test relies on the heating and/or cooling of a sealed fuel tank to drive changes in fuel tank pressure over a duration. However, this requires a temperature gradient between the fuel system and the ambient atmosphere. If the ambient temperature is within a threshold of the fuel system temperature, the fuel tank temperature may not change enough to generate a pressure differential. Further, if the ambient temperature is dynamic (e.g. the vehicle is parked in the morning while temperature is increasing), the EONV test may abort, or end with an indeterminate result. Initiating an EONV test under unfavorable conditions may thus decrease the execution rate of the test.

FIG. 2 depicts a high-level method 200 for an engine-off natural vacuum test. Method 200 will be described with relation to the system depicted in FIG. 1, but it should be understood that similar methods may be used with other systems without departing from the scope of this disclosure. Method 200 may be carried out by controller 12, and may be stored as executable instructions in non-transitory memory.

Method 200 may begin at 205. At 205, method 200 may include determining whether a vehicle-off event has occurred. The vehicle-off event may include an engine-off event, and may be indicated by other events, such as a key-off event. If no vehicle-off event is detected, method 200 may proceed to 210. At 210, method 200 may include recording that an EONV test was not executed, and may further include setting a flag to retry the EONV test at the next detected vehicle-off event. Method 200 may then end.

If a vehicle-off event is detected, method 200 may proceed to 215. At 215, method 200 may include determining whether entry conditions for an EONV test are met. Entry conditions may include a threshold amount of time passed since the previous EONV test, a threshold length of engine run time prior to the engine-off event, a threshold amount of fuel in the fuel tank, and a threshold battery state of charge. If entry conditions are not met, method 200 may proceed to 210. At 210, method 200 may include recording that an EONV test was not executed, and may further include setting a flag to retry the EONV test at the next detected vehicle-off event. Method 200 may then end.

Although entry conditions may be met at the initiation of method 200, conditions may change during the execution of the method. For example, an engine restart or refueling event may be sufficient to abort the method at any point prior to completing method 200. If such events are detected that would interfere with the performing of method 200 or the interpretation of results derived from executing method 200, method 200 may proceed to 210, record that an EONV test was aborted, and set a flag to retry the EONV test at the next detected vehicle-off event, and then end.

If entry conditions are met, method 200 may proceed to 220. At 220, method 200 may include determining whether ambient conditions are predicted to meet criteria for an EONV test. One example method for determining whether ambient conditions are predicted to meet criteria for an EONV test is described in detail herein and with regards to FIG. 3. Briefly, controller 12 may retrieve historic and forecast weather data from off-board computing system 99. The retrieved data may be resampled, aggregated, and used to establish a predicted weather profile for the expected duration of the EONV test (e.g. 45-60 minutes). In particular, the predicted weather profile may be utilized to determine the likelihood and magnitude of potential temperature changes during the expected EONV test duration, and further to determine whether the potential temperature changes are likely to result in an EONV test resulting in a result (pass/fail) or likely to result in an indeterminate or aborted EONV test.

If ambient conditions are not predicted to meet criteria for an EONV test, method 200 may proceed to 205, and set a flag to retry the EONV test at the next detected engine-off event. If ambient conditions are predicted to meet criteria for an EONV test, method 200 may proceed to 225. At 225, method 200 may include maintaining the PCM on despite the engine-off and/or vehicle off condition. In this way, the method may continue to be carried out by controller 12. Method 200 may further include allowing the fuel system to stabilize following the engine-off condition. Allowing the fuel system to stabilize may include waiting for a period of time before method 200 advances. The stabilization period may be a pre-determined amount of time, or may be an amount of time based on current operating conditions. The stabilization period may be based on the predicted ambient conditions. In some examples, the stabilization period may be characterized as the length of time necessary for consecutive measurements of a parameter to be within a threshold of each other. For example, fuel may be returned to the fuel tank from other fuel system components following an engine off condition. The stabilization period may thus end when two or more consecutive fuel level measurements are within a threshold amount of each other, signifying that the fuel level in the fuel tank has reached a steady-state. In some examples, the stabilization period may end when the fuel tank pressure is equal to atmospheric pressure. Following the stabilization period, method 200 may proceed to 230.

At 230, method 200 may include closing a canister vent valve (CVV). Additionally or alternatively, a fuel tank isolation valve (FTIV) may be closed where included in the fuel system. In this way, the fuel tank may be isolated from atmosphere. The status of a canister purge valve (CPV) and/or other valves coupled within a conduit connecting the fuel tank to atmosphere may also be assessed and closed if open. Method 200 may then proceed to 235.

At 235, method 200 may include performing a pressure rise test. While the engine is still cooling down post shutdown, there may be additional heat rejected to the fuel tank. With the fuel system sealed via the closing of the CVV, the pressure in the fuel tank may rise due to fuel volatizing with increased temperature. The pressure rise test may include monitoring fuel tank pressure for a period of time. Fuel tank pressure may be monitored until the pressure reaches a threshold, the threshold pressure indicative of no leaks above a threshold size in the fuel tank. The threshold pressure may be based on the current conditions, including the ambient temperature, the fuel level, the fuel volatility, etc. In some examples, the rate of pressure change may be compared to an expected rate of pressure change. The fuel tank pressure may not reach the threshold pressure. Rather the fuel tank pressure may be monitored for a predetermined amount of time, or an amount of time based on the current conditions. The fuel tank pressure may be monitored until consecutive measurements are within a threshold amount of each other, or until a pressure measurement is less than the previous pressure measurement. The fuel tank pressure may be monitored until the fuel tank temperature stabilizes. Method 200 may then proceed to 240.

At 240, method 200 may include determining whether the pressure rise test ended due to a passing result, such as the fuel tank pressure reaching a pressure threshold. If the pressure rise test resulted in a passing result, method 200 may proceed to 245. At 245, method 200 may include recording the passing test result. Continuing at 250, method 200 may include opening the canister vent valve. In this way, the fuel system pressure may be returned to atmospheric pressure. Method 200 may then end.

If the pressure rise test did not result in a pass, method 200 may proceed to 255. At 255, method 200 may include opening the CVV and allowing the system to stabilize. Opening the CVV allows the fuel system pressure to equilibrate to atmospheric pressure. The system may be allowed to stabilize until the fuel tank pressure reaches atmospheric pressure, and/or until consecutive pressure readings are within a threshold of each other. Method 200 may then proceed to 260.

At 260, method 200 may include closing the CVV. In this way, the fuel tank may be isolated from atmosphere. As the fuel tank cools, the fuel vapors should condense into liquid fuel, creating a vacuum within the sealed tank. Continuing at 265, method 200 may include performing a vacuum test.

Performing a vacuum test may include monitoring fuel tank pressure for a duration. Fuel tank pressure may be monitored until the vacuum reaches a threshold, the threshold vacuum indicative of no leaks above a threshold size in the fuel tank. The threshold vacuum may be based on the current conditions, including the ambient temperature, the fuel level, the fuel volatility, etc. In some examples, the rate of pressure change may be compared to an expected rate of pressure change. The fuel tank pressure may not reach the threshold vacuum. Rather the fuel tank pressure may be monitored for a predetermined duration, or a duration based on the current conditions.

Continuing at 270, method 200 may include determining whether a passing result was indicated for the vacuum test, such as the fuel tank vacuum reaching a pressure threshold. If the vacuum test resulted in a passing result, method 200 may proceed to 245. At 245, method 300 may include recording the passing test result. Continuing at 250, method 200 may include opening the canister vent valve. In this way, the fuel system pressure may be equilibrated to atmospheric pressure. Method 200 may then end.

If the vacuum test did not result in a passing result, method 200 may proceed to 275. At 275, method 200 may include recording the failing test result. Continuing at 280, method 200 may include opening the canister vent valve. Method 200 may then end.

FIG. 3 shows a flow chart for an example high level method 300 for obtaining and processing historical and forecast weather data. Method 300 may be run as an independent method, or as a subroutine of another method, for example method 200. Method 300 will be described with relation to the system depicted in FIG. 1, but it should be understood that similar methods may be used with other systems without departing from the scope of this disclosure. Method 300 may be carried out by controller 12, and may be stored as executable instructions in non-transitory memory.

Method 300 may begin at 310. At 310, method 300 includes obtaining historic and forecasted weather information. For example, controller 12 may retrieve historic and forecasted weather information from off-board computing system 99. The weather information may be retrieved from one or more data servers, including government and/or private data collection services that provide historic and forecasted weather data in a retrievable format, for example, via an application programming interface. The weather information retrieved may be based on the location of the vehicle as determined by an on-board GPS. For example, data from the nearest available weather stations may be retrieved. The retrieved data may include temperature, humidity, barometric pressure, precipitation, wind, etc. and may include metadata indicating time, day, year, location, etc.

Continuing at 320, method 300 includes processing the retrieved data into an aggregatable format. Historic weather information may be stored in a compressed data format. For example, temperature data may be stored as a function of changes in temperature. In other words, if the temperature is stable for a period of time, the data may only indicate when a temperature change occurred, or may otherwise have fewer data samples stored compared with a time period where the temperature changed dramatically, and thus stored with a higher sampling rate. As such, compressed historic data may first be re-sampled to make the data aggregatable and compatible with forecast data. For example, the data may be sampled in 15 minute increments. For historic and/or forecast data stored as changes over time, non-symmetric fuzzy membership functions may be imposed on the data. For example, an observed temperature change of 3° F. from 10:00 to 10:53 may be distributed into 15 minute increments (e.g. 20%) (0.6° into 10:00-10:15, 25%)(0.75° into 10:15-10:30, 40%)(1.2° into 10:30-10:45, and 15%) (0.45° into 10:45-11:00). Non-symmetric functions may be applied to account for observed changes being distributed mostly into past time blocks. Fuzzy membership functions may be used in order to decrease required computation power.

Continuing at 330, method 300 includes aggregating the processed data. If data is retrieved from multiple sources, the data may be averaged or otherwise combined such that each time increment is given a single data point for each data category. Temperature data may be aggregated in the form of temperature change potential. For example, each 15 minute increment may be assigned a potential change in temperature that may occur during the increment. A low pass filter may be applied to historic data such that more weight is given to more recent data, and less weight is given to less recent data. A learning rate may be assigned to indicate how rapidly less recent data is removed from the change potential calculations. Representing temperature data as temperature change potential is advantageous in that the data is in an integratable form. As such, given an initial temperature starting point a temperature change potential map or table may be used to predict an change in ambient temperature over future time increments. The predicted ambient temperature profile may then be applied to determine a change in temperature of a vehicle subsystem. As the temperature of a fuel tank or other vehicle component is based on multiple factors (including drive time, engine speed, engine load, etc.) the change potential may provide a more accurate depiction of future vehicle subsystem temperature. Further, as parking conditions may change, simply using ambient temperature may not provide an accurate depiction of future vehicle subsystem temperature.

Continuing at 340, method 300 includes generating a predicted weather profile. The temperature profile may be predicted for a number of time increments equal to or longer than the amount of time needed to complete an EONV test. The prediction may be based on the smoothed, aggregated data, including both historic data and current forecast data. The predicted weather profile may include a temperature gradient between the vehicle system and the surrounding atmosphere. For example, the prediction may be performed as a summation or integration, such as:

$$Temp(T + dt) = Temp(T) + \sum_{i=1}^{K} \omega * \text{T\_Map}(T, dt)$$

In this example, Temp(T) is the set point of the current vehicle system or ambient temperature. K is the number of time increments for the prediction, including the prediction horizon. T_Map(T, dt) is a summed value retrieved from the change potential map. For example, the temperature change potential may be retrieved from four consecutive 15 minute time increments, and summed to determine a predicted temperature change after one hour. If the prediction horizon falls between two time increments, a percentage of a change potential for the final time increment may be calculated. ω represents an adaptive term (such as a scalar) to account for the fact that system temperature may be based in part on ambient temperature. The summation may then be used to determine a temperature gradient. In other words, the temperature gradient may indicate the magnitude and direction of temperature change of the vehicle system over the testing duration based on the predicted ambient temperature change potential.

As described with regard to FIG. 2, the predicted weather profile may be used to determine a likelihood of an EONV test executing successfully and/or accurately. By not initiating an EONV test during unfavorable conditions, a reduction in aborted tests may be realized, leading to improved performance metrics. If an ambient temperature is expected to change less than a threshold, or be maintained at or above the fuel tank temperature, the EONV test may not be initiated. Further, if the predicted weather includes a high likelihood of precipitation, wind, or other conditions that may affect vehicle system temperature or fuel tank pressure, the EONV test may not be initiated.

Continuing at 350, method 300 may include adapting data weighting and/or prediction models based on the actual weather profile that occurs during the predicted time increments. The historical and forecast data may be processed by a plurality of algorithms (or plurality of values within a single algorithm) to determine if a more accurate prediction could be made. For example, a strength or value of the low pass filter may be altered to allow more or less influence by historical data. Further, the learning rate may be increased or decreased for future predictions. Method 300 may then end.

Alternatively or additionally, the results of an EONV test may be validated or invalidated based on weather conditions that occur during the EONV test. It may be power-restrictive to maintain ambient weather sensors and/or cloud communication on during the EONV test. As such, the weather conditions during the test may not be monitored in real-time. Even if a prediction indicates a likelihood of favorable weather conditions, variable weather fronts, wind, precipitation, etc. may produce conditions leading to false test results. By retrieving the actual conditions following the EONV test, the results may be validated or invalidated, thus leading to more robust testing with fewer false results.

FIG. 4 depicts a high-level method 400 for validating an engine-off natural vacuum test based on retrieved weather data. Method 400 will be described with relation to the system depicted in FIG. 1, but it should be understood that similar methods may be used with other systems without departing from the scope of this disclosure. Method 400 may be carried out by controller 12, and may be stored as executable instructions in non-transitory memory.

Method 400 begins at 405. At 405, method 400 may include determining whether a vehicle-off event has occurred. The vehicle-off event may include an engine-off event, and may be indicated by other events, such as a key-off event. If no vehicle-off event is detected, method 400 may proceed to 410. At 410, method 400 may include recording that an EONV test was not executed, and may further include setting a flag to retry the EONV test at the next detected vehicle-off event. Method 400 may then end.

If a vehicle-off event is detected, method 400 may proceed to 415. At 415, method 415 may include determining whether entry conditions for an EONV test are met. Entry conditions may include a threshold amount of time passed since the previous EONV test, a threshold length of engine run time prior to the engine-off event, a threshold amount of fuel in the fuel tank, and a threshold battery state of charge. As described with regard to FIGS. 2 and 3, determining if entry conditions are met may include retrieving historic and/or forecast weather data from an off-board computing system, and determining whether predicted weather conditions during the anticipated testing duration are favorable for executing an EONV test. If entry conditions are not met, method 400 may proceed to 410. At 410, method 400 may include recording that an EONV test was not executed, and may further include setting a flag to retry the EONV test at the next detected vehicle-off event. Method 400 may then end.

If EONV test entry conditions are met, method 400 may proceed to 420. At 420, method 400 may include performing an EONV test. An example EONV test was described herein and with regards to FIG. 2. Briefly, the fuel system may be allowed to stabilize, and then may be sealed by closing a canister vent valve. The EONV test may include a pressure rise test portion, and, if a threshold pressure is not met, may further include a vacuum test portion. Failure to reach a threshold vacuum during a testing duration may result in a failing test result being recorded. Reaching a threshold pressure or vacuum during those respective test portions may result in a passing test result being recorded. Following the EONV test, the CVV may be opened, and the test may end. Continuing at 425, method 400 may include storing the EONV test results until the next vehicle-on event. This may include the storing of a pass/fail test result, and may further include the storing of an indeterminate test result, such as an aborted test.

Continuing at 430, following a vehicle-on event, method 400 may include determining whether a passing or failing EONV test result was recorded. If a passing or failing EONV test result was not recorded (e.g. the test was indeterminate, and/or the test was aborted) method 400 may proceed to 410. At 410, method 400 may include setting a flag to retry the EONV test at the next vehicle-on event. Method 400 may then end. If a passing or failing EONV test was recorded, method 400 may proceed to 435. At 435, method 400 may include retrieving historical weather data for the EONV test duration. As described with regard to FIG. 3, controller 12 may retrieve historic and forecasted weather information from off-board computing system 99. The weather information may be retrieved from one or more data servers, including government and/or private data collection services that provide historic and forecast weather data in a retrievable format, for example, via an application programming interface. The weather information retrieved may be based on the location of the vehicle as determined by an on-board GPS. For example, data from the nearest available weather stations may be retrieved. The retrieved data may include temperature, humidity, barometric pressure, precipitation, wind, etc. and may include metadata indicating time, day, year, location, etc. Controller 12 may process the data to extract the relevant data from the EONV test period, and further to port the data to a format where it can be analyzed and compared to data recorded during the EONV test.

Continuing at 440, method 400 may include determining if the EONV test data is consistent with the retrieved weather data. For example, the EONV test data may be analyzed via one or more algorithms or models that determine predicted results of the EONV test based on input weather data. For example, if the ambient temperature increased or was otherwise above the fuel system temperature during the testing duration, a tank pressure rise would have been expected to be observed. Similarly, a temperature decrease would be expected to correlate with an observed change in vacuum. If the test results are not consistent with the ambient temperature profile, they may be invalidated. Among other conditions, an EONV test may be invalidated due to precipitation, changes in barometric pressure, wind above a threshold, changes in dew point, and/or ambient temperatures within a threshold of the system, as these conditions may influence the pressure profile of the fuel system over the testing duration.

If the EONV test results are consistent with the retrieved weather data, method 400 may proceed to 445. At 445, method 400 may include indicating that the test results are valid, and may further include recording the result of the EONV test. Continuing at 450, method 400 may include setting a flag to not execute an EONV test at the next vehicle-off event. Method 400 may then end. If the EONV test results are not consistent with the retrieved weather data, or are invalidated by the retrieved weather data, method 400 may proceed to 455. At 455, method 400 may include discarding the EONV test results, and may further include indicating that an EONV test should be retried at the next vehicle-off event. Method 400 may then end.

The system described herein and depicted in FIG. 1, along with the methods described herein and depicted in FIGS. 2-4 may enable one or more systems and one or more methods. IN one example, a method for a vehicle, comprising: initiating an engine-off natural vacuum test based on an ambient temperature change potential over a testing duration. The ambient temperature change potential may be based on historic weather data and further based on forecast weather data. The historic weather data and forecast weather data may be retrieved from an off-board computing system. The method may further comprise: re-sampling the historic weather data and forecast weather data; and distributing the re-sampled data into an aggregated data set. In some examples, the method may further comprise: applying a low-pass filter to the aggregated data set, the low-pass filter configured such that more recent data is given more weight than less recent data. The ambient temperature change potential over the testing duration may be based on an integration of the filtered aggregated data set. The method may further comprise: determining a temperature gradient over the testing duration based on a comparison of the ambient temperature change potential and a fuel system temperature. In some examples, the method may further comprise: initiating an engine-off natural vacuum test responsive to the determined temperature gradient being greater than a threshold. The method may further comprise: adjusting a property of the low-pass filter based on a recorded ambient temperature change during the testing duration. In some examples, the method further comprises: validating a result of an engine-off natural vacuum test based on weather data recorded during the testing duration. The technical result of implementing this system is an increase in EONV test completion. By determining a potential temperature change profile prior to initiating the test, the EONV test can be initiated under favorable conditions, thereby reducing the number of aborted tests due to a lack of fuel tank pressure change.

In another example, a system for a vehicle, comprising: a fuel system coupled to an evaporative emissions system; and a controller configured with instructions in non-transitory memory, that when executed cause the controller to: responsive to an indication to perform an engine-off natural vacuum test, and further responsive to a vehicle-off event, retrieving historic weather data and forecast weather data from an off-board computing system; determining an ambient temperature change potential over a testing duration; and initiating the engine-off natural vacuum test based on the ambient temperature change potential. The system may further comprise: an on-board global positioning system; and the controller may be further configured with instructions in non-transitory memory, that when executed cause the controller to: retrieve historic weather data and forecast weather data based on a location of the vehicle as determined by the on-board global positioning system. In some example, the controller may be further configured with instructions in non-transitory memory, that when executed cause the controller to: re-sample the historic weather data and forecast weather data; and distribute the re-sampled data into an aggregated data set. The controller may further configured with instructions in non-transitory memory, that when executed cause the controller to: apply a low-pass filter to the aggregated data set, the low-pass filter configured such that more recent data is given more weight than less recent data. In some examples, the controller may be further configured with instructions in non-transitory memory, that when executed cause the controller to: determine an ambient temperature change potential over the testing duration based on an integration of the filtered aggregated data set. The controller may be further configured to determine a temperature gradient over the testing duration based on a comparison of the ambient temperature change potential and a fuel system temperature, and still further configured to initiate an engine-off natural vacuum test responsive to the determined temperature gradient being greater than a threshold. In some examples, the controller is further configured with instructions to: responsive to completing the engine-off natural vacuum test, retrieve recorded weather data for the testing duration; and adjusting a property of the low-pass filter based on a comparison of the retrieved recorded weather data and the ambient temperature change potential, and still further configured to validate a result of the engine-off natural vacuum test based on the retrieved recorded weather data. The technical result of implementing this system is that EONV test entry conditions may be relaxed. By determining an accurate profile of ambient conditions, a more accurate prediction of fuel tank pressure changes over the testing duration may be obtained. Thus, the test may be more made more robust, and other entry conditions may be relaxed while maintaining or improving the overall execution rate of the test.

In yet another example, a method for validating an evaporative emissions system leak test, comprising: performing an engine-off natural vacuum test for a testing duration; storing a result of the engine-off natural vacuum test at a controller; responsive to a vehicle-on event, retrieving historic weather data for the testing duration from an off-board computing system; and validating the result of the engine-off natural vacuum test based on the retrieved historic weather data. The technical result of implementing this method is a decrease in false test results. For example, rain, wind, or other weather conditions may skew the fuel tank temperature profile and thus skew the fuel tank pressure profile during the test. With this method, such results may be discarded and flagged for follow-up. Further, results may be validated based on recorded weather conditions, making the EONV test more robust.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
   initiating an engine-off natural vacuum test based on an ambient temperature change potential over a testing duration, the ambient temperature change potential based on historic weather data and forecast weather data retrieved from an off-board computing system;
   re-sampling the historic weather data and forecast weather data;
   distributing the re-sampled data into an aggregated data set; and
   applying a low-pass filter to the aggregated data set, the low-pass filter configured such that more recent data is given more weight than less recent data.

2. The method of claim 1, where the ambient temperature change potential over the testing duration is based on an integration of the filtered aggregated data set.

3. The method of claim 2, further comprising:
   determining a temperature gradient over the testing duration based on a comparison of the ambient temperature change potential and a fuel system temperature.

4. The method of claim 3, further comprising:
   initiating an engine-off natural vacuum test responsive to the determined temperature gradient being greater than a threshold.

5. The method of claim 1, further comprising:
   adjusting a property of the low-pass filter based on a recorded ambient temperature change during the testing duration.

6. The method of claim 1, further comprising:
   validating a result of an engine-off natural vacuum test based on weather data recorded during the testing duration.

7. A system for a vehicle, comprising:
   a fuel system coupled to an evaporative emissions system; and a controller configured with instructions in non-transitory memory, that when executed cause the controller to:
responsive to an indication to perform an engine-off natural vacuum test, and further responsive to a vehicle-off event, retrieving historic weather data and forecast weather data from an off-board computing system;
re-sampling the historic weather data and the forecast weather data;
distributing the re-sampled data into an aggregated data set;
applying a low-pass filter to the aggregated data set, the low-pass filter configured such that more recent data is given more weight than less recent data;
determining an ambient temperature change potential over a testing duration; and
initiating the engine-off natural vacuum test based on the ambient temperature change potential.

8. The system of claim 7, further comprising:
an on-board global positioning system; and
wherein the controller is further configured with instructions in non-transitory memory, that when executed cause the controller to:
retrieve historic weather data and forecast weather data based on a location of the vehicle as determined by the on-board global positioning system.

9. The system of claim 7, where the controller is further configured with instructions in non-transitory memory, that when executed cause the controller to:
determine the ambient temperature change potential over the testing duration based on an integration of the filtered aggregated data set.

10. The system of claim 9, where the controller is further configured with instructions in non-transitory memory, that when executed cause the controller to:
determine a temperature gradient over the testing duration based on a comparison of the ambient temperature change potential and a fuel system temperature.

11. The system of claim 10, where the controller is further configured with instructions in non-transitory memory, that when executed cause the controller to:
initiate an engine-off natural vacuum test responsive to the determined temperature gradient being greater than a threshold.

12. The system of claim 7, where the controller is further configured with instructions in non-transitory memory, that when executed cause the controller to:
responsive to completing the engine-off natural vacuum test, retrieve recorded weather data for the testing duration; and
adjust a property of the low-pass filter based on a comparison of the retrieved recorded weather data and the ambient temperature change potential.

13. The system of claim 12, where the controller is further configured with instructions in non-transitory memory, that when executed cause the controller to:
validate a result of the engine-off natural vacuum test based on the retrieved recorded weather data.

14. A method for validating an evaporative emissions system leak test, comprising:
performing an engine-off natural vacuum test for a testing duration;
storing a result of the engine-off natural vacuum test at a controller;
responsive to a vehicle-on event, retrieving historic weather data for the testing duration from an off-board computing system; and
validating the result of the engine-off natural vacuum test based on the retrieved historic weather data.

* * * * *